United States Patent
Weigand et al.

(10) Patent No.: US 6,899,126 B2
(45) Date of Patent: May 31, 2005

(54) CHECK VALVE AND VALVE ARRANGEMENT COMPRISING SUCH A CHECK VALVE

(75) Inventors: Bernd Weigand, Lohr/Main (DE); Marius Cornea, Lohr/Main (DE); Lorenz Lippert, Gemünden (DE); Edwin Palesch, Lenningen (DE); Gerold Sluka, Neckartailfingen (DE)

(73) Assignee: Hydraulik-Ring GmbH, Nürtingen (DE)

( * ) Notice: Subject to any disclaimer, the term of this patent is extended or adjusted under 35 U.S.C. 154(b) by 6 days.

(21) Appl. No.: 10/064,861

(22) Filed: Aug. 23, 2002

(65) Prior Publication Data

US 2003/0070713 A1 Apr. 17, 2003

(30) Foreign Application Priority Data

Sep. 5, 2001 (DE) .......................................... 101 43 433

(51) Int. Cl.$^7$ ............................................. F16K 15/14
(52) U.S. Cl. ................... 137/512.15; 137/517; 137/860
(58) Field of Search ......................... 137/512.15, 512.3, 137/843, 860, 512.4, 517

(56) References Cited

U.S. PATENT DOCUMENTS

| | | | | |
|---|---|---|---|---|
| 699,273 A | * | 5/1902 | Wolski | 137/517 |
| 894,286 A | * | 7/1908 | Reineking | 137/843 |
| 1,860,163 A | * | 5/1932 | Wyzenbeek | 137/512.4 |
| 2,649,105 A | * | 8/1953 | Stout et al. | 137/517 |
| 2,781,059 A | * | 2/1957 | Frey | 137/517 |
| 2,918,941 A | * | 12/1959 | Whiting | 137/512.15 |
| 3,459,217 A | * | 8/1969 | Callahan | 137/512.15 |
| 3,783,590 A | * | 1/1974 | Allen | 137/853 |
| 3,882,891 A | * | 5/1975 | Viles et al. | 137/512.15 |
| 4,241,758 A | | 12/1980 | Eiermann | 137/512.15 |
| 5,323,806 A | * | 6/1994 | Watari et al. | 137/517 |

FOREIGN PATENT DOCUMENTS

| | | |
|---|---|---|
| DE | 20 43 002 | 3/1972 |
| EP | 0 069 531 | 1/1983 |
| FR | 525 481 | 9/1921 |
| GB | 2 161 583 | 1/1986 |

* cited by examiner

*Primary Examiner*—John Rivell
(74) *Attorney, Agent, or Firm*—Gudrun E. Huckett

(57) ABSTRACT

A check valve is mounted in a valve arrangement having a valve member with an annular channel and at least one bore opening into the annular channel. The check valve has a closing element configured to close the at least one bore in the annular channel. The closing element is formed of a strip shaped as a ring. The strip of the check valve is arranged in the annular channel of the valve member.

19 Claims, 4 Drawing Sheets

CHECK VALVE AND VALVE ARRANGEMENT COMPRISING SUCH A CHECK VALVE

BACKGROUND OF INVENTION

1. Field of the Invention

The invention relates to a check valve comprising at least one closing element with which at least one bore can be closed. The invention further relates to a valve arrangement having such a check valve integrated therein.

2. Description of the Related Art

Check valves are usually individual valves whose closing element is configured as a valve ball, valve cone or valve pin. The closing element is pressed by the force of a pressure spring against a valve seat. The check valves are often mounted in the axial direction within the valve arrangement.

SUMMARY OF INVENTION

It is an object of the present invention to configure the check valve of the aforementioned kind and the valve arrangement of the aforementioned kind such that they require only minimal mounting space while providing a constructively simple configuration.

In accordance with the present invention, this is achieved in regard to the check valve in that the closing element is comprised of a strip which is bent to a ring. In accordance with the present invention, this is moreover achieved in regard to the valve arrangement in that the check valve is arranged in an annular channel of the valve arrangement into which annular channel at least one bore opens.

The closing element of the check valve according to the invention is comprised of a bent annular strip. The annular strip requires only a minimal mounting space and can be arranged in an annular channel of the valve arrangement according to the invention. The closing element forms a simple constructive component which cannot only be manufactured in a simple way but can also be mounted easily and inexpensively. Advantageously, the annular strip is comprised of a springy material so that the strip itself can form, at least partially, the closure or closing part. It is possible to stamp a closing part at least partially out of the strip wherein the closing part is then connected by a spring stay to the material of the strip. In such a case, the respective bore is opened or closed by means of this closing part.

The valve arrangement according to the invention is advantageously a cartridge valve in which the check valve is mounted. The annular strip of the check valve according to the invention acts in a radial direction in the valve sleeve so that the valve arrangement according to the invention must have only a minimal length in the axial direction.

DETAILED DESCRIPTION

Figure 1:
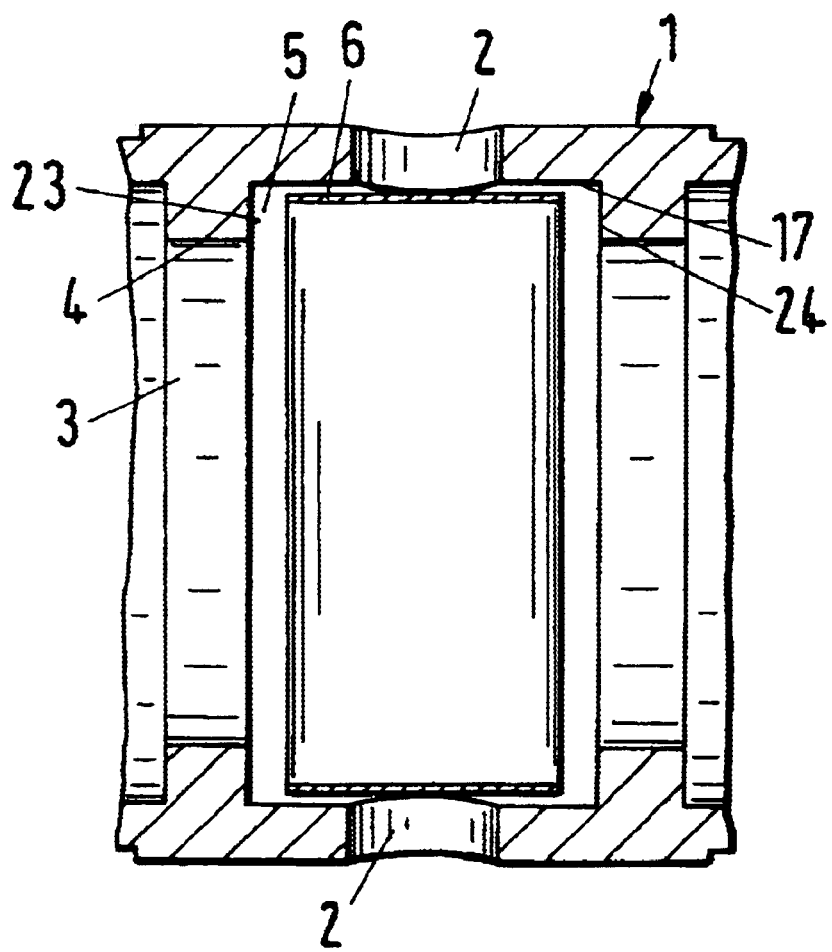
FIG. 1 is an axial section of a part of the valve arrangement according to the invention.

FIG. 1 shows a valve member in the form of a cylindrical valve sleeve 1 of a switching or proportional valve arrangement. Such switching or proportional valve arrangements are known and are therefore not explained in detail in this context. The valve sleeve 1 has distributed about its circumference several bores 2 via which hydraulic medium can flow into a central bore 3 of the valve sleeve 1. An annular groove 5 is arranged in the inner wall 4 of the valve sleeve 1; bores 2 open into this annular groove 5.

The bores 2 can be closed by a closing element 6 which is comprised of a rolled annular strip. The axial width of the closing element 6 is slightly smaller than the axial width of the annular groove 5; the annular groove 5 has a relatively minimal radial depth. The diameter of the closing element 6 can be enlarged or decreased in a way to be described in the following for closing or opening the bores 2.

Figure 2:
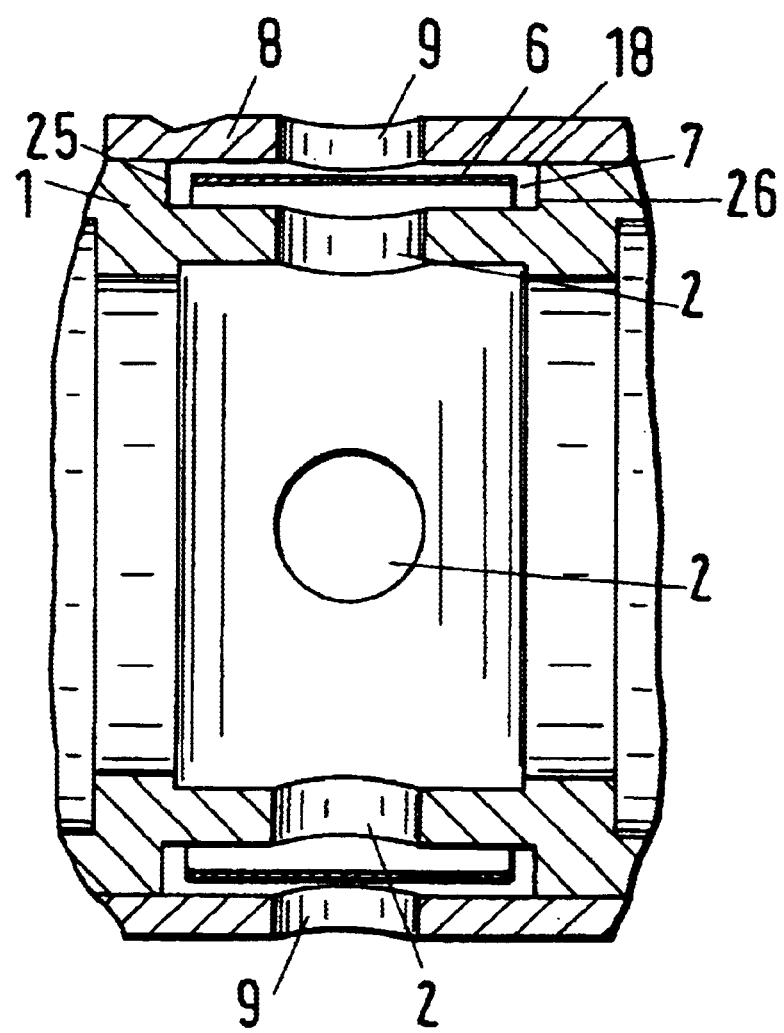
FIG. 2 shows a second embodiment of the valve arrangement according to the invention in a representation corresponding to FIG. 1.

FIG. 2 shows a closing element 6 of a check valve positioned in an annular groove 7 which is provided in the exterior wall of the valve sleeve 1. The valve member comprises also an auxiliary sleeve 8 as a radial securing means which is seated on the valve sleeve 1 and closes the annular groove 7 radially outwardly. The auxiliary sleeve 8 has bores 9 which are advantageously aligned with the bores 2 in the valve sleeve 1.

Figure 3:
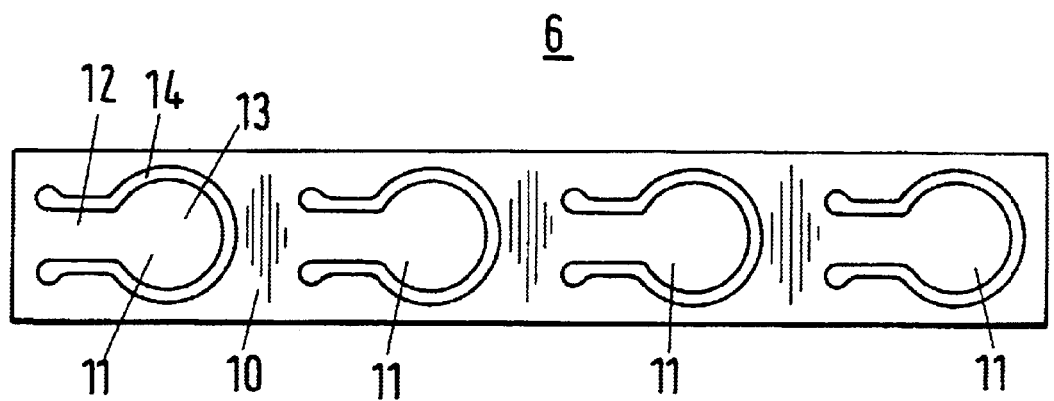
FIG. 3 shows a first embodiment of a closing element of the check valve according to the invention in a plan view.
Figure 4:
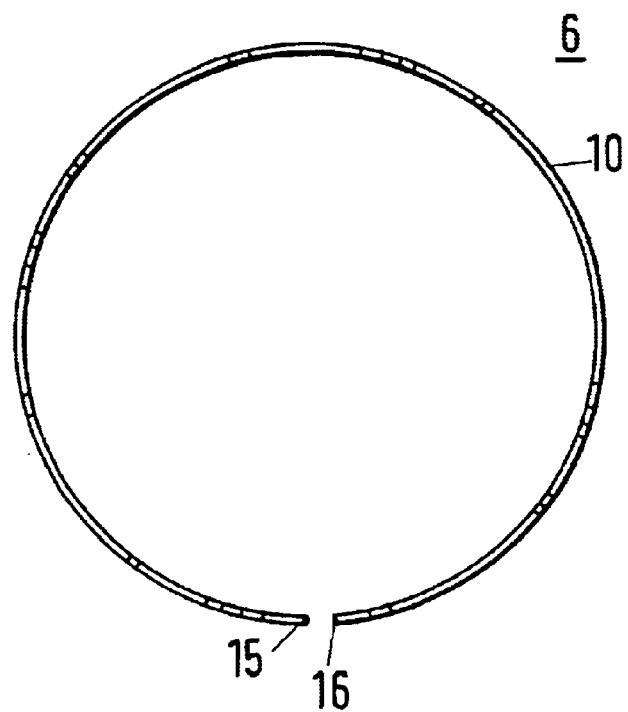
FIG. 4 shows the closing element according to FIG. 3 in a side view.

FIGS. 3 and 4 show a first embodiment of the closing element 6. The closing element 6 is formed by a strip-shaped member (strip) 10 with rectangular contour. The strip 10 is bent into a ring shape for forming the closing element 6. Individual closures in the form of springy flaps 11 are partially stamped out of the strip 10 with which the corresponding bores 2 in the valve sleeve 1 can be closed. As illustrated in FIG. 3, the flaps 11 are positioned in the longitudinal direction of the strip 10 at a spacing to one another. The flaps 11 are advantageously identical and are comprised of a spring stay or leg 12 arranged at half the width of the strip 10 and a circular closing part 13 connected to the leg 12. The spring stay or leg 12 connects the flap 11 to the material of the strip 10. In order for the flap 11 to be able to carry out the required movements for closing and opening the bores 2, the leg 12 (at least partially) and the closing part 13 are separated from the remaining material of the strip 10 by a gap 14.

The strip 10, as illustrated in FIG. 4, is bent to a ring. The two ends 15, 16 of the strip 10 are positioned at a minimal spacing from one another. The strip 10 is mounted such in the valve sleeve 1 that the flaps 11 are positioned at the level of the bores 2. Since the flaps 11 are separated by the gap 14 from the remaining material of the strip 10, the springy flaps 11 are not bent or not bent by the same amount when bending the strip 10 to a ring. This has the result that the flaps 11 rest with pretension against the valve sleeve 1 such that the closing part 13 of the flaps 11 closes the bores 2, respectively.

It is also possible to bend the flaps 11 out of the bent strip 10 to such an extent that they rest against the valve sleeve 1 with the spring force required for the respective application.

Finally, it is also possible to bend the flaps 11 by the same amount as the strip 10 so that the flaps 11 do not project from the strip 10. In this case, the entire strip rests with pretension against the bottom 17 of the annular groove 5 (FIG. 1) or against the inner side 18 of the auxiliary sleeve 8 (FIG. 2). In this case, the flaps 11 close the bores 9 in the auxiliary sleeve 8.

When the pressure of the hydraulic medium present within the bores 2 or 9 surpasses the spring force of the flaps 11 or of the entire closing element 6, the flaps 11 are bent elastically into the release position so that the hydraulic medium can flow through the now open bores 2 or 9. As soon as the spring force of the flaps 11 is again greater than the pressure of the hydraulic medium, the flaps 11 spring back into their initial closing position.

The closing element 6 can also be comprised of a strip 10 which has no springy flaps 11. In this case, the closing element 6 simultaneously forms a spring element whose diameter is elastically widened or contracted for opening and closing the bores 2 or 9. The bores 2 or 9 are closed in a first position of the closing element 6 and released (opened) in a second position of the closing element 6. The spring force of the strip 10 bent to a ring is matched to the respective application of the valve arrangement. The spring force is selected such that the bores 2, 9 are released for a predetermined pressure of the hydraulic medium in that the diameter of the closing element is enlarged or reduced.

Figure 5:
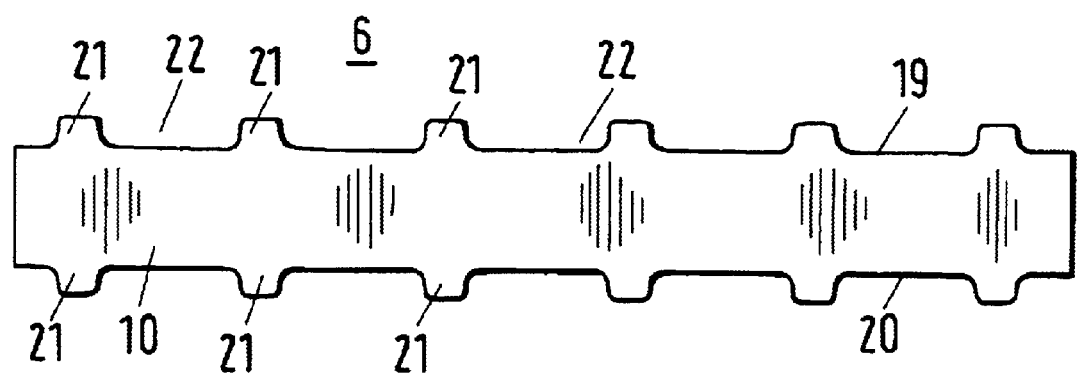
FIG. 5a second embodiment of a closing element of the check valve according to the invention in a representation corresponding to FIG. 3.
Figure 6:
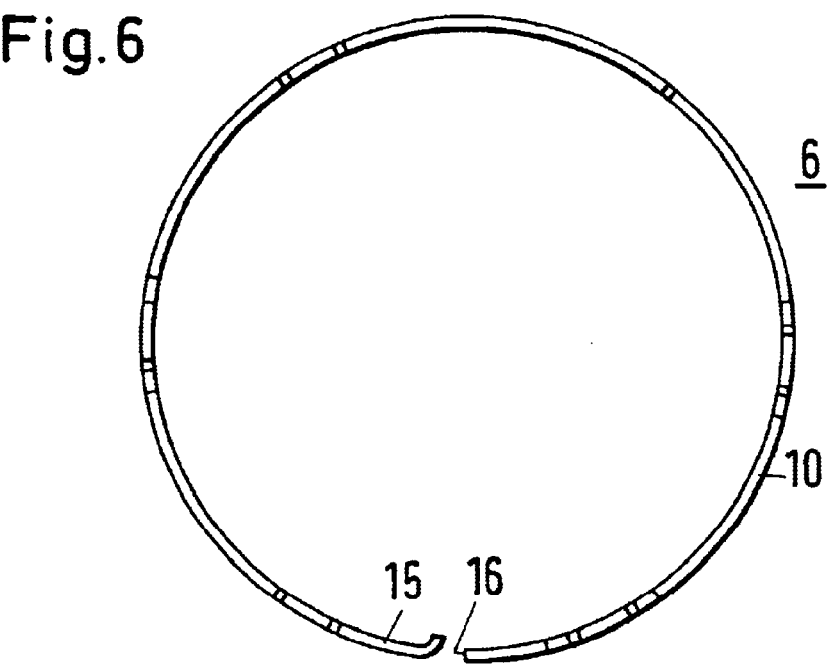
FIG. 6 shows the second embodiment of the closing element according to FIG. 5 in a representation corresponding to FIG. 4.

FIGS. 5 and 6 show an embodiment in which the strip 10 has no partially stamped-out flaps 11. Instead the rectangular strip 10 is provided with projections 21 along the two longitudinal sides 19, 20. The projections 21 are provided at a spacing to one another along the longitudinal sides 19, 20. Advantageously, the projections 21 are positioned at identical spacing sequentially behind one another. The projections 21 provided at the two longitudinal sides 19, 20 are positioned advantageously at the same level. Free spaces 22 are formed between the projections 21.

The strip 10, as shown in FIG. 6, is again bent to a ring and is inserted into the respective valve arrangement in its bent state. In the mounted position of the closing element 6, the projections 21 serve as lateral stops contacting the sidewalls 23, 24 of the annular groove 5 (FIG. 1) or the sidewalls 25, 26 of the annular groove 7 (FIG. 2). The entire strip 10 serves in this case as a closing element with which the bores 2, 9 are released (opened) or closed. Depending on the pressure of the hydraulic medium, the diameter of the closing element 6 is enlarged or decreased.

In contrast to the embodiment of FIGS. 3 and 4, one end 15 of the strip 10 is bent radially inwardly (FIG. 6). The two ends 15, 16 of the strip 10, as illustrated in FIG. 6, can have a spacing from one another in the mounted position. Advantageously, the ends 15, 16 overlap one another. In this way, a safe functioning of the closing element 6 during its service life is ensured and an excellent sealing action is provided even when the ends of the strip are positioned so as to cover a bore. In the embodiment according to FIGS. 3 and 4, the ends 15, 16 of the strip 10 can also advantageously overlap one another.

In contrast to the illustrated embodiment, the strip 10 can be formed simply of a rectangular strip without projections 21. In this case, the strip 10 in the bent annular state provides the function of a closing element as well as of a spring element.

In the described situations, the ring springs back into an initial position in which it rests against the valve sleeve 1 (FIG. 1) or against the auxiliary sleeve 8 (FIG. 2) under the force of its pretension. However, it is also possible to configure the closing element 6 such that in its initial position it is positioned floatingly in the respective annular groove 5, 7.

The closing element 6 is formed in the described embodiments by a spring strip which is bent to a ring whose two ends 15, 16 are positioned at a spacing from one another. In this way, the ring can be reliably elastically deformed into the closing and release positions, respectively.

The bores 2, 9 have advantageously a circular contour. The sealing edges accordingly are also circular.

By means of the closing element 6 all bores 2, 9 on the periphery of the valve arrangement can be closed or opened. The closing element 6 can also be configured such that only one bore or a portion of the bores is closed or released.

Since the closing element 6 is formed of a strip 10, preferably a spring strip, it occupies only a minimal space in the mounted position. The closing element 6 can be fitted comfortably into the annular groove 5, 7 of the valve arrangement which annular groove 5, 7 has only a minimal radial depth. The closing element 6 can be arranged in a pressure channel P, a tank channel T, or a working channel A, B, preferably in the pressure channel P, which is formed by a corresponding annular groove of the valve arrangement.

The described check valve can also be mounted in slide bores of control blocks which are used preferably in connection with cam shaft adjusters.

The closing element 6 can be secured in the mounted position against rotation or turning about its axis by securing means (not illustrated). The securing means against rotation can be formed, for example, by a pin, a cutout or the like.

While specific embodiments of the invention have been shown and described in detail to illustrate the inventive principles, it will be understood that the invention may be embodied otherwise without departing from such principles.

What is claimed is:

1. A valve arrangement comprising at least one check valve, the check valve comprising a closing element configured to close at least one bore, wherein the closing element is comprised of a strip formed to a ring, wherein the valve arrangement comprises a valve member having an annular channel and at least one bore opening into the annular channel, wherein the strip of the at least one check valve is arranged in the annular channel wherein the strip has an initial position in which initial position the strip is floatingly arranged in the annular channel.

2. The valve arrangement according to claim 1, wherein the annular channel is arranged in a valve sleeve of the valve member.

3. The valve arrangement according to claim 2, wherein the annular channel has a width greater than a width of the strip.

4. The valve arrangement according to claim 2, wherein the annular channel is arranged in an inner wall of the valve sleeve.

5. The valve arrangement according to claim 2, wherein the annular channel is arranged in an outer wall of the valve sleeve wherein the valve member comprises an auxiliary sleeve surrounding the valve sleeve and closing the annular channel radially outwardly.

6. The valve arrangement according to claim 1, wherein the strip is comprised of spring steel.

7. The valve arrangement according to claim 1, wherein the strip has a substantially rectangular contour.

8. The valve arrangement according to claim 1, wherein the strip has ends spaced apart from one another in a mounted position of the strip.

9. The valve arrangement according to claim 1, wherein the strip has ends overlapping one another in a mounted position of the strip.

10. The valve arrangement according to claim 1, wherein the strip has at least one end which is bent radially inwardly.

11. The valve arrangement according to claim 1, wherein the strip has a diameter which is elastically widenable or reducible.

12. The valve arrangement according to claim 1, wherein the strip has at least one closure.

13. The valve arrangement according to claim 12, wherein the at least one closure is separated from the strip by a gap.

14. The valve arrangement according to claim 13, wherein the at least one closure comprises a closing part and a spring stay connecting the closing part to material of the strip.

15. The valve arrangement according to claim 14, wherein the spring stay is partially separated from the strip by the gap.

16. The valve arrangement according to claim 14, wherein the closing part and the spring stay are arranged symmetrically relative to a longitudinal center plane of the strip.

17. The valve arrangement according to claim 1, wherein the strip has longitudinal sides and wherein at least one of the longitudinal sides has at least one projection.

18. A valve arrangement comprising at least one check valve, the check valve comprising a closing element configured to close at least one bore, wherein the closing element is comprised of a strip formed to a ring, wherein the valve arrangement comprises a valve member having an annular channel and at least one bore opening into the annular channel, wherein the strip of the at least one check valve is arranged in the annular channel, wherein the annular channel is arranged in an outer wall of a valve sleeve of the valve member, wherein the valve member comprises an auxiliary sleeve surrounding the valve sleeve and closing the annular channel radially outwardly, wherein the strip rests with elastic pretension against the auxiliary sleeve.

19. The valve arrangement according to claim 18, wherein the strip is secured against rotation relative to the annular channel.

* * * * *